(12) United States Patent
Price et al.

(10) Patent No.: US 8,831,396 B1
(45) Date of Patent: Sep. 9, 2014

(54) HOMOGENIZING OPTICAL FIBER APPARATUS AND SYSTEMS EMPLOYING THE SAME

(75) Inventors: Kirk Price, Battle Ground, WA (US); Scott Lerner, Portland, OR (US)

(73) Assignee: nLIGHT Photonics Corporation, Vancouver, WA (US)

( * ) Notice: Subject to any disclaimer, the term of this patent is extended or adjusted under 35 U.S.C. 154(b) by 89 days.

(21) Appl. No.: 13/285,119

(22) Filed: Oct. 31, 2011

(51) Int. Cl.
| | | |
|---|---|---|
| *G02B 6/10* | (2006.01) | |
| *G02B 6/42* | (2006.01) | |
| *G02B 6/04* | (2006.01) | |
| *G02B 6/06* | (2006.01) | |
| *G02B 6/00* | (2006.01) | |

(52) U.S. Cl.
CPC ............ *G02B 6/0061* (2013.01); *G02B 6/0045* (2013.01); *G02B 6/0038* (2013.01); *G02B 6/006* (2013.01)
USPC ............. 385/146; 385/39; 385/116; 385/121; 385/133; 362/551

(58) Field of Classification Search
CPC ........ G02B 6/262; G02B 6/06; G02B 6/0038; G02B 6/0096; G02B 6/0045; G02B 6/0046
USPC ..................... 385/31, 39, 115–121, 133, 146; 362/551–555, 558, 582
See application file for complete search history.

(56) References Cited

U.S. PATENT DOCUMENTS

| | | | | |
|---|---|---|---|---|
| 4,952,022 | A * | 8/1990 | Genovese | 385/116 |
| 5,661,837 | A * | 8/1997 | Yamamoto et al. | 385/115 |
| 6,519,387 | B1 | 2/2003 | Sunagawa et al. | |
| 6,595,673 | B1 * | 7/2003 | Ferrante et al. | 362/551 |
| 7,171,097 | B2 | 1/2007 | Cianciotto et al. | |
| 7,684,668 | B2 | 3/2010 | Cianciotto et al. | |
| 2007/0147758 | A1 | 6/2007 | Cummings | |
| 2008/0058783 | A1 * | 3/2008 | Altshuler et al. | 606/9 |
| 2008/0180787 | A1 * | 7/2008 | DiGiovanni et al. | 359/334 |
| 2010/0226396 | A1 | 9/2010 | Hollemann | |
| 2011/0034973 | A1 | 2/2011 | Wang | |

* cited by examiner

*Primary Examiner* — Charlie Peng
*Assistant Examiner* — Hung Lam
(74) *Attorney, Agent, or Firm* — Ethan A. McGrath

(57) ABSTRACT

A beam homogenizing apparatus includes at least one flexible optical fiber for receiving light, the flexible optical fiber including a homogenizing output portion having a tileable cross-section, the output portion for producing a substantially homogenized intensity profile for light emitted therefrom.

6 Claims, 3 Drawing Sheets

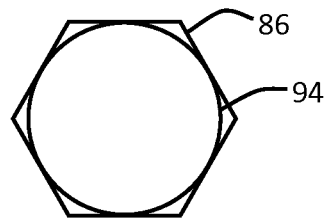
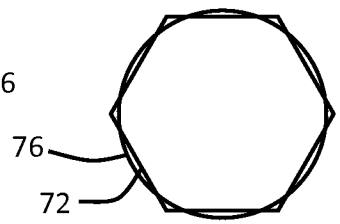
FIG. 6  FIG. 7  FIG. 8
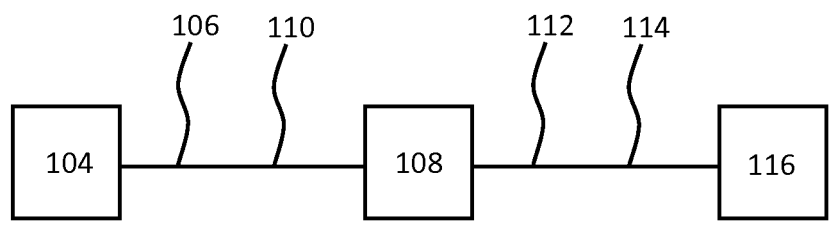
FIG. 9
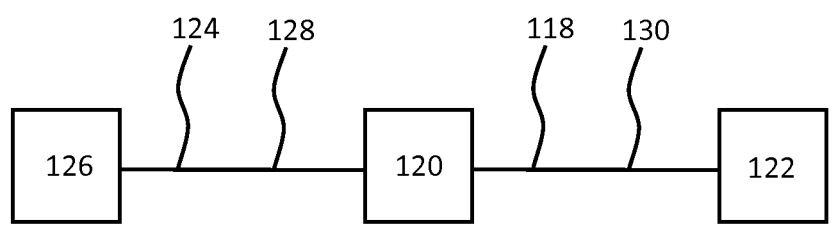
FIG. 10

US 8,831,396 B1

HOMOGENIZING OPTICAL FIBER APPARATUS AND SYSTEMS EMPLOYING THE SAME

BACKGROUND OF THE INVENTION

1. Field of the Invention

Generally, the field of the present invention is laser beam homogenization. More particularly, the present invention relates to the homogenization of laser light using optical fiber.

2. Background

For many applications, a homogenized light source is required. A homogenized beam can provide predictable energy values and can provide uniform effects on workpieces. For one example, in U.S. Pat. No. 7,171,097 to Cianciotto et al., a hex tube light homogenizer is described. Light from fiber optic cables is directed to an input of a rigid hexagonal tube having highly reflective surfaces on the interior thereof and exits the tube at an output thereof in a homogenized form. In U.S. Pat. No. 7,684,668, also to Cianciotto et al., rigid, hollow, and bent hexagonal light tubes are described that are optically coupled to fiber optic light sources to receive light therefrom and emit at an output a homogenized light beam. A complex electroforming process is used to fabricate the tubes with their highly reflective interiors. Also, the highly reflective interiors are composed from expensive material, namely gold or silver.

For another example, in U.S. Pat. Publ. 2007/0147758 to Cummings, a rigid rotationally symmetric lightpipe includes a rotationally asymmetric portion disposed inside it either for a portion of the length of the entire lightpipe beginning at the input thereof or for the entire length of the lightpipe. The asymmetric portion homogenizes the input light and a circular output is created by the homogenized beam propagating through the symmetric portion or by the gradual leakage of light past a semi-transparent asymmetric interior surface to the reflective symmetric interior surface. Expensive materials and a complex process to fabricate the finished lightpipes must be employed.

The foregoing examples demonstrate the efforts made to achieve a homogenized beam with optical components that are more robust than optical fibers made previously of specialized glass, such as quartz glass. However, the foregoing examples still have the drawbacks of expensive material usage and complicated manufacturing processes. Thus, there remains a need for further innovation.

SUMMARY OF THE INVENTION

The present invention is directed to an innovation that overcomes the shortcomings of prior art homogenization methods and components by producing a homogenized beam with optical components that are lower cost, easier to implement, and flexibly movable. More particularly, the present invention provides beam homogenization with a flexible optical fiber having a tileable cross-section such that when light is coupled into an input end of the fiber the light transmitted from the output end has a substantially homogenized transverse spatial intensity profile. The present invention is particularly suited to high-power light applications such as the homogenization of high power laser sources.

Accordingly, in one aspect of the present invention, an apparatus includes a flexible optical fiber for receiving light, the flexible optical fiber including a homogenizing output portion having a tileable cross-section, wherein the output portion is for producing a substantially homogenized intensity profile for light emitted therefrom. The apparatus may have a passive interior region with a substantially constant refractive index. The apparatus may also have core-cladding fiber configuration, wherein the tileable cross-section forms the interior and defines a core-clad boundary. A buffer material of arbitrary shape can provide a protective jacketing to the homogenizing fiber. The flexible optical fiber may include an input portion having a similar tileable cross-section. In a preferred embodiment, the input and output portions and length of the flexible optical fiber have the same tileable cross-section throughout.

In another aspect of the present invention, an apparatus includes a flexible optical fiber having an output portion with a tileable cross-section, an input portion with a circular cross-section, and a middle portion continuously connecting the input portion and the output portion such that therealong the circular cross-section smoothly changes to the tileable cross-section. An alternative to this aspect of the present invention involves reversible application of light through the smoothly changing optical fiber.

According to another aspect of the present invention, an apparatus includes an aforementioned flexible optical fiber and an additional flexible optical fiber optically coupled at an input portion thereof to the output of the aforementioned flexible optical fiber. The optical coupling may be one of direct splice or via free-space optics disposed between the respective coupled outputs. In a similar aspect, an apparatus operable in a reverse direction that includes the components described above but wherein light is coupled into the additional flexible optical fiber and optically coupled into the tileable optical fiber.

Also according to aspects of the present invention are systems that include the aforementioned apparatus that includes a flexible optical fiber with a tileable cross-section. Such systems make use of the flexibility and homogenization capabilities of the optical fiber of the present invention in order to provide increased robustness and utility.

The foregoing and other objects, features, and advantages will become more apparent from the following detailed description, which proceeds with reference to the accompanying figures.

BRIEF DESCRIPTION OF THE DRAWINGS

FIG. 6 is a cross-sectional view overlay in another aspect of the present invention.

FIG. 7 is another cross-sectional view overlay in another aspect of the present invention.

FIG. 8 is another cross-sectional view overlay in another aspect of the present invention.

FIG. 9 is a block diagram of a laser system according to the present invention.

FIG. 10 is a second block diagram of a laser system according to the present invention.

DETAILED DESCRIPTION OF THE INVENTION

Figure 1:
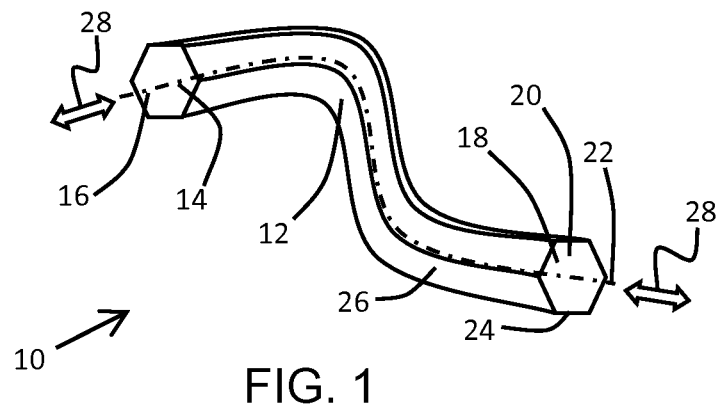
FIG. 1 is a perspective view of one embodiment of a homogenizing optical fiber apparatus in accord with the present invention.

Referring to FIG. 1, an exemplary embodiment of a homogenizing apparatus 10 is shown that includes at least one flexible optical fiber 12. Optical fiber 12 has a hexagonal cross-section 14 extending from a first end 16 to a second end 18. Suitable cross-sectional spans range from 50 μm up to 1000 μm or more, depending on the application. Optical fiber 12 can be made from silica or other materials and will have a particular refractive index profile suitable for in-coupling and propagating light while maintaining the flexible nature of the fiber. While fibers can be made to include an active medium in an interior region 20 thereof, such as the addition of an active core disposed generally coaxially with a central axis 22 thereof, optical fiber 12 is a passive fiber having a constant refractive index across the cross-section and length thereof. The hexagonal cross-section 14 of fiber 12 is defined by and terminates at an outer boundary 24. Outside the outer boundary 24 is a cladding or buffer jacketing 26 with a different refractive index from the interior region 20 of fiber 12 to ensure internal reflection of light propagating through the interior region 20. To represent the capability of fiber 12 to operate bi-directionally, adjacent to fiber ends 16, 18 double-headed arrows 28 are shown. Thus, light may be coupled into first end 16 or second end 18 for propagation through to the opposite end, and in some embodiments light may be coupled into both ends.

Cross-sections other than the hexagonal cross-section 14 of the optical fiber 12 are within the scope of the present invention. In some embodiments, the cross-section has a rectangular, square, parallelogram, or triangular configuration. In each case, the cross-section is tileable in nature, that is, the cross-section is shaped such that when the ends of multiple fibers having the respective cross-sections are arranged on a flat surface the cross-sections can cover the surface without having any overlap or gaps between cross-sections. The adherence of the fiber 12 to the tileable shape directly affects the light homogeneity at the output of the optical system.

Figure 2:
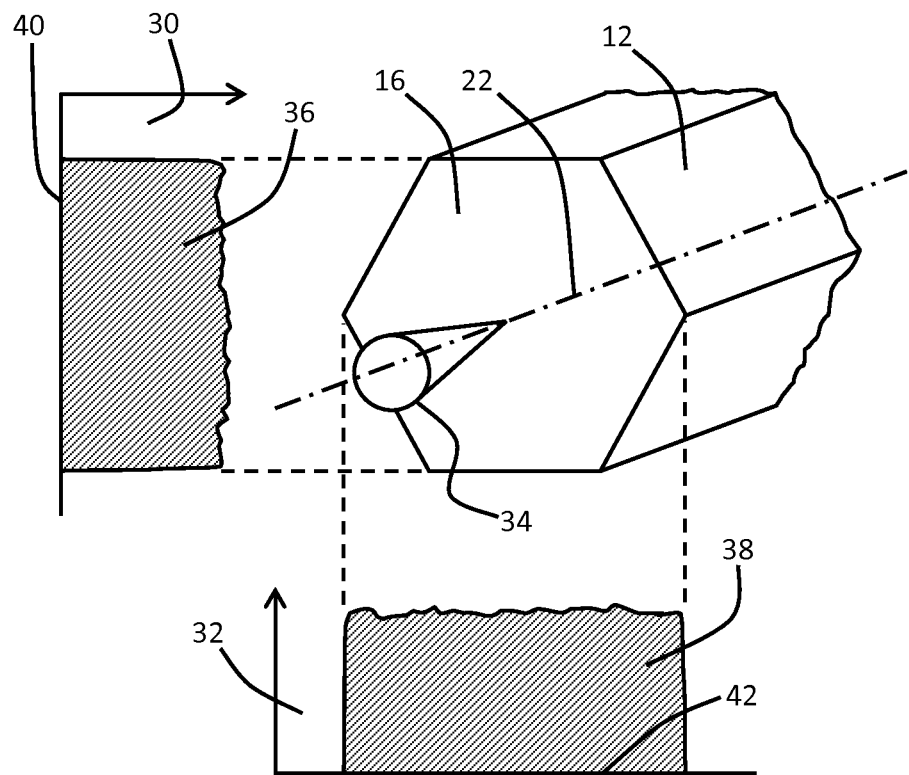
FIG. 2 is a two-axis chart of intensity distribution in accord with the present invention.

Referring now to FIG. 2, a perspective view is shown of a first end 16 of optical fiber 12 with two charts 30, 32 corresponding to orthogonal axes of the emitted light in the near-field. Also shown is an example cone of light 34 emitted from the first end 16 along central axis 22. Vertical chart 30 shows a depiction of the vertical intensity distribution 36 of light emitted from a vertical slice of cross-section 14 of the fiber 12. Similarly, horizontal chart 32 shows a depiction of the intensity distribution 38 of light emitted from a horizontal slice of cross-section 14 of the fiber 12. The respective near-field distributions 36, 38 have a characteristic flatness illustrating the homogenization of the beam output of first end 16 in both transverse orthogonal axes 40, 42 across the entire cross-section 14 of the fiber 12.

In many applications in which the light originates from a laser source, the intensity profile of the light needs to be homogeneous and uniform over a laser process spot, requiring the light beam from the laser source to be transformed to a uniform near-field intensity profile. Often this beam transformation requires the near-field profile to be transformed into a square, rectangular, or circular spot. Often, expensive fly's eye arrays, monolithic tapered lightpipes, rigid integrating rods, free-space optics or other optical components are used to achieve the uniform near-field profile. In some systems, expensive top-hat spatial filters are employed to alter the characteristics of the beam to achieve an intensity distribution that is substantially flat across one or more orthogonal axes transverse to the direction of propagation. In other systems, homogenizing light pipes or light guides are used to create intensity uniformity across one or more of the aforementioned axes. Homogenizing apparatus 10 can replace the expensive filters and rigid light pipes with a more versatile and flexible package.

The homogenizing operation of the apparatus 10 will now be described in further detail. The number of optical modes allowed to propagate in a fiber, such as fiber 12, is generally determined by the NA of the fiber, the fiber size, and the fiber shape. When light is coupled into a fiber, the coupled light typically a subset of the modes supported by the fiber and the output from the fiber has some mixture of the launched modes to the optically supported modes. It is generally understood that bending of the fibers can cause mode-mixing in the far-field profile, but has little effect on the near-field intensity profile. Herein the tileable shape causes the mode-mixing so that light launched into the fiber is evenly distributed to the supported modes and produces a uniform spatial output of the tileable fiber having greater than 90% optical homogeneity. Because the fiber is passive, there is no mode competition, i.e., the launched modes are evenly distributed to the supported optical propagation modes of the fiber, resulting in high levels of optical homogeneity. The level of departure from a tileable shape reduces the corresponding optical uniformity that can be achieved. When there are curved edges or surfaces or other geometries that depart from the tileable shape there is a loss in optical uniformity.

For fibers with uniform non-tileable cross-sections, a homogenous input that completely fills the input aperture will be preserved at the output. Such non-tileable cross-sections can be placed generally in two categories. A pentagonal cross-section is an example of non-tileable cross-section in a first category in which pseudo-tiling results in an overlap between cross-sections. For this first category a non-uniform input may result in a homogenous output, however, the length of fiber required to produce the homogenous output is substantially longer than for a tileable cross-section. A circle and octagon are examples of a second category of a non-tileable cross-section in which pseudo-tiling results in gaps between cross-sections. For this second category it may not be possible to completely homogenize the output even with a very long fiber, and the degree of homogenization depends on the relative size of the gaps between the cross-sections after tiling. Importantly, a tileable cross-section achieves a high homogenization light in a shorter length compared to a non-tileable cross-section, resulting in robustness to tolerance errors compared to a non-tileable fiber. Thus, it will be readily understood that only tileable shapes are suitable to produce a homogenous output from a single fiber of minimal length. It is within the scope of the present invention to line multiple fibers adjacent to each other and tile them together for outputting a combined beam, although the present invention is directed more to the use of a tileable type shape to create a homogenous beam out of a single fiber.

Figure 3:
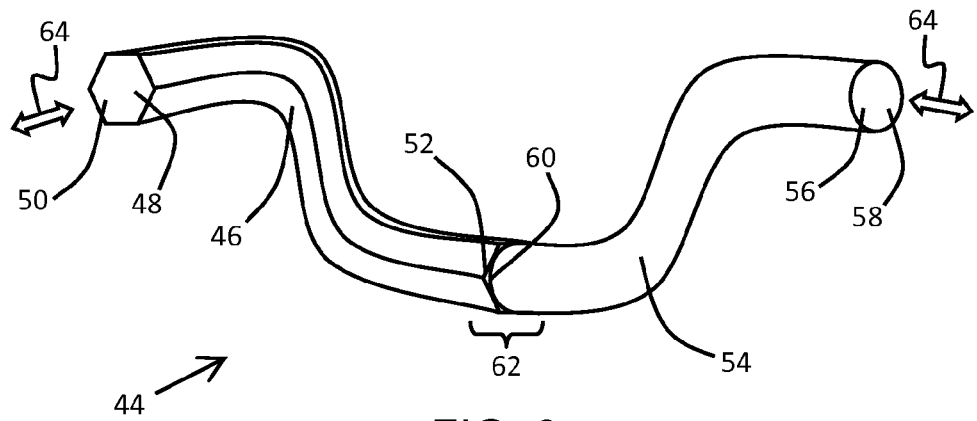
FIG. 3 is a perspective view of a second embodiment of the apparatus in accord with the present invention.

Other embodiments similar to homogenizing apparatus 10 will now be described in further detail. Referring to FIG. 3, a flexible homogenizing apparatus 44 is shown that includes at least one first fiber 46 having a hexagonal cross-section 48 and opposite first and second ends 50, 52 and at least one second fiber 54 having a circular cross-section 56 and opposite first and second ends 58, 60. The first fiber 46 at the second end 52 thereof is optically coupled at a splice 62 to second end 60 of second fiber 54. The bi-directionality capability of the homogenizing apparatus 44 is shown with double-headed arrows 64. Thus, light may be coupled into first end 50 of first fiber 46 or first end 58 of second fiber 54 for propagation through to the opposite end of apparatus 44, and in some embodiments light may be coupled into both ends for propagation to both opposite ends. Cross-sections other than the hexagonal cross-section 48 of first optical fiber 44 may also be used. For example, in some embodiments, the cross-section 48 has a rectangular, square, parallelogram, diamond, or triangular configuration. In each case, the cross-section is similarly tileable in nature, as was discussed hereinbefore.

Figure 4:
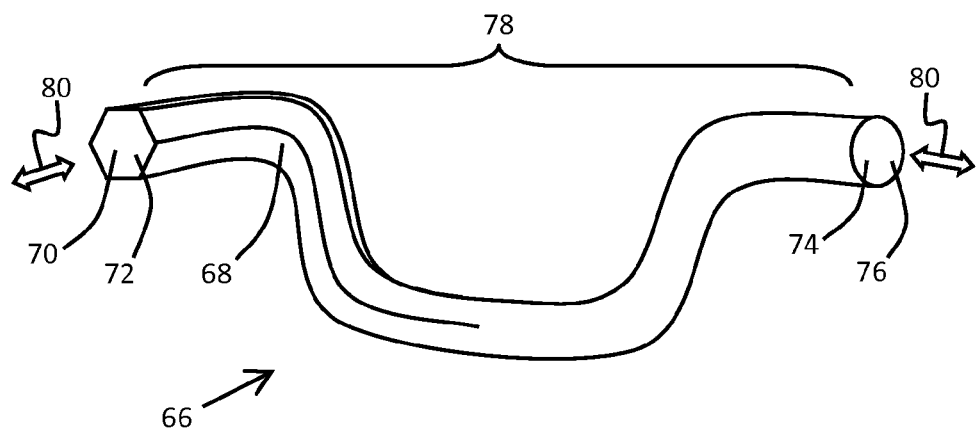
FIG. 4 is a perspective view of a third embodiment of the apparatus in accord with the present invention.

In FIG. 4 a tapered homogenizing apparatus 66 is shown. Apparatus 66 includes at least one flexible optical fiber 68 having a first end 70 with a hexagonal cross-section 72 and having a second end 74 with circular cross-section 76. The hexagonal cross-section 72 changes smoothly to circular cross-section 76. The change may also occur more quickly on one end of the fiber than the other, such as changing rapidly from hexagonal to circular closer to the first end 70 or closer to the second end 74. Apparatus 66 therefore provides an optical coupling between a hexagonal first end 70 and circular second end 74 through a smooth tapered transition 78 along the entire length of fiber 68 or some portion thereof. The bi-directionality capability of the homogenizing apparatus 66 is shown with double-headed arrows 80. Thus, light may be coupled into the first or second ends 70, 74 of fiber 68 for propagation through to the opposite end of apparatus 66, and in some embodiments light may be coupled into both ends for propagation to both opposite ends. Cross-sections other than the hexagonal cross-section 72 may also be used. For example, in some embodiments, the cross-section 72 has a rectangular, square, parallelogram, or triangular configuration. In each case, the cross-section is similarly tileable in nature, as was discussed hereinbefore for other embodiments in accord with the present invention.

Figure 5:
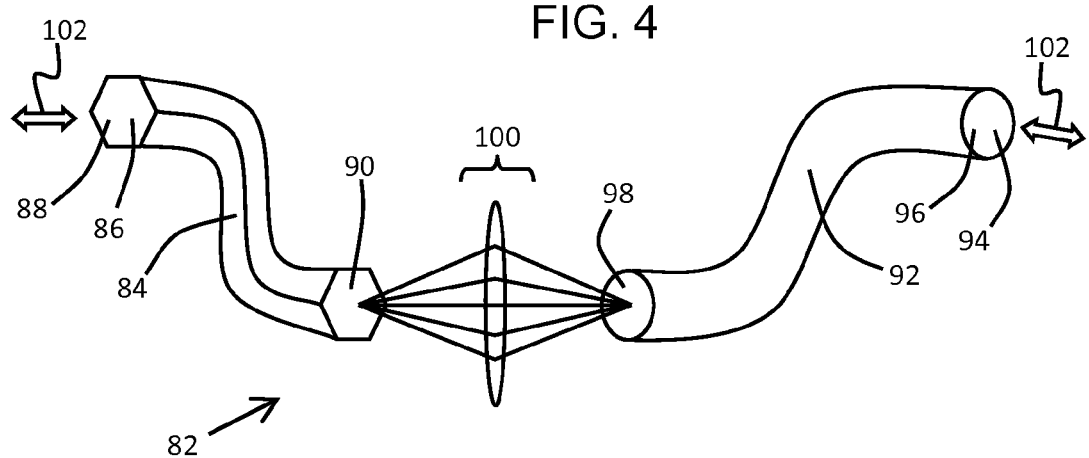
FIG. 5 is a perspective view of a fourth embodiment of the apparatus in accord with the present invention.

In FIG. 5 a free-space based homogenizing apparatus 82 is shown. Apparatus 82 includes at least one first optical fiber 84 having a hexagonal cross-section 86 and opposite first and second ends 88, 90 and at least one second fiber 92 having a circular cross-section 94 and opposite first and second ends 96, 98. The first fiber 84 at the second end 90 thereof is optically coupled via free-space optics 100 to second end 98 of second fiber 92. The free-space optics 100 may be of any type suitable for optically coupling first and second fibers 84, 92. The bi-directionality capability of the homogenizing apparatus 82 is shown with double-headed arrows 102. Thus, light may be coupled into first end 88 of first fiber 86 or first end 96 of second fiber 92 for propagation through to the opposite end of apparatus 82, and in some embodiments light may be coupled into both ends for propagation to both opposite ends. Cross-sections other than the hexagonal cross-section 86 of first optical fiber 44 may also be used. For example, in some embodiments, the cross-section 48 has a rectangular, square, parallelogram, or triangular configuration. In each case, the cross-section is similarly tileable in nature, as was discussed hereinbefore.

Referring to FIGS. 6 and 7, for the free-space homogenizing apparatus 82 of FIG. 5, the relative sizes of the hexagonal and circular cross-sections 86, 94 are shown for optimized unidirectional configurations. For light coupled into the first end 88 of first fiber 84, optimal coupling efficiency between fibers 84, 92 occurs when the circular cross-section 94 of the second end 98 of second fiber 92 encompasses the hexagonal cross-section 86 of the second end 90 of first fiber 84, as shown in FIG. 7. Likewise, for light coupled into the first end 96 of second fiber 92, optimal coupling efficiency between fibers 84, 92 occurs when the hexagonal cross-section 86 of second end 90 of first fiber 84 encompasses the circular cross-section 94 of second end 98 of second fiber 92, as shown in FIG. 6. For the spliced apparatus 44 of FIG. 3, similar fiber cross-sectional encompassing relationships to those shown in FIGS. 6 and 7 provide optimum brightness conservation and coupling efficiency at splice 62. With tapered homogenizing apparatus 66, the hexagonal and circular cross-sections can be identically matched, as shown in FIG. 8, to provide optimal brightness conservation.

The aforementioned homogenizing apparatuses and variations thereof may be implemented in laser systems to achieve desirable results. In one exemplary system embodiment depicted in FIG. 9, a laser source 104 providing a beam 106 with a beam parameter product matched to homogenizing apparatus 108 is also connected via an optical coupling 110 to the homogenizing apparatus 108. The emitted homogenized beam 112 is then directed through an optical coupling 114 or optical imaging system, such as free-space optics, to a target 116 for material processing thereof. In some instances the target may be a medical target, such as skin or ocular surfaces. In other embodiments the targets may be industrial in nature, such as for plastics welding, glass on glass frit sealing, uniform marking or etching, materials ablation, or mask-less materials processing. Because of the uniform spatial intensity distribution of the beam, the precision of the beam is enhanced allowing the omission or alteration of expensive masks or other beam altering components. Often, process optics may be used singly or in conjunction with mechanical components to deliver the beam to the target. For example, reimaging optics, scanning heads, articulated arms, or X-Y gantries may all be used to direct the beam to a target in a careful or controlled manner.

In other systems, such as the one depicted in FIG. 10, a homogenized beam 118 emitted from homogenizing apparatus 120 is directed to a laser gain medium 122 to provide optical pumping of the medium 122. More specifically, a beam 124 from a light source 126, such as a laser source, is directed via an optical coupling 128 to homogenizing apparatus 120. The emitted homogenized beam 118 is directed via an optical coupling 130 such as an optical imaging system to a solid state block 122 of a diode-pumped solid-state laser. The flat spatial intensity distribution of the pump light enables homogenous pumping without requiring more expensive beam-shaping optics. Because the beam is emitted from a fiber, re-imaging the beam is simple and moreover, the homogenizing fiber more closely maintains the brightness of the diode pump source, thereby enabling a long Rayleigh range. Also, because flexible fiber is used to produce a homogenized output, the fiber is bend insensitive, allowing motion and component flexibility in the design of the laser system.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:
1. An apparatus comprising:
a high power laser light source; and
a flexible optical fiber configured to receive light emitted from said high power laser light source, said flexible optical fiber including a homogenizing output portion having a tileable cross-section and including an output end, said output portion extending from said output end a predetermined length sufficient for producing a substantially homogenized intensity profile for high power laser light emitted therefrom, said flexible optical fiber also including an input portion having said tileable cross-section, wherein said tileable cross-section is constant throughout the length of said flexible optical fiber.
2. The apparatus of claim 1 wherein said flexible optical fiber is a passive flexible optical fiber having a substantially constant refractive index therein.

3. The apparatus of claim 1 wherein said flexible optical fiber is a double-clad fiber, said tileable cross-section forming a double-clad boundary outside of which a cladding extends outward to an outside boundary.

4. The apparatus of claim 1 wherein said high power laser light source includes a beam parameter product closely matched to said flexible optical fiber.

5. The apparatus of claim 1 further comprising:
a solid state laser gain medium optically coupled to said flexible optical fiber, said solid state laser gain medium being optically pumped by the homogenized high power laser light emitted from said flexible optical fiber.

6. The apparatus of claim 1 further comprising:
an optical imaging system optically coupled to said flexible optical fiber, said optical imaging system for receiving homogenized light emitted from said flexible optical fiber and for directing the homogenized light to a target.

* * * * *